(12) United States Patent
Pelley et al.

(10) Patent No.: US 8,917,136 B1
(45) Date of Patent: Dec. 23, 2014

(54) CHARGE PUMP SYSTEM AND METHOD OF OPERATION

(71) Applicants: Perry H. Pelley, Austin, TX (US); Michael G. Neaves, Austin, TX (US); Ravindraraj Ramaraju, Round Rock, TX (US)

(72) Inventors: Perry H. Pelley, Austin, TX (US); Michael G. Neaves, Austin, TX (US); Ravindraraj Ramaraju, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/151,886

(22) Filed: Jan. 10, 2014

(51) Int. Cl.
*G05F 1/10* (2006.01)
*H02M 3/07* (2006.01)

(52) U.S. Cl.
CPC .................................. *H02M 3/07* (2013.01)
USPC .......................................................... 327/536

(58) Field of Classification Search
CPC .............................. H02M 3/07; H02M 3/073
USPC .......................................... 327/535, 536, 537
See application file for complete search history.

(56) References Cited

U.S. PATENT DOCUMENTS

| | | | |
|---|---|---|---|
| 6,259,612 B1 * | 7/2001 | Itoh ................................. | 363/60 |
| 6,518,830 B2 * | 2/2003 | Gariboldi et al. ............. | 327/536 |
| 6,876,246 B2 * | 4/2005 | Kim ................................ | 327/536 |
| 7,312,972 B2 * | 12/2007 | Hourai et al. ................. | 361/139 |
| 7,902,910 B2 * | 3/2011 | Park et al. ..................... | 327/536 |

* cited by examiner

*Primary Examiner* — Jeffrey Zweizig

(74) *Attorney, Agent, or Firm* — Joanna G. Chiu; James L. Clingan, Jr.

(57) ABSTRACT

A charge pump system includes a charge pump, a switchable impedance, a comparator, and a capacitor. The switchable impedance has an input coupled to the output of the charge pump. The comparator has a first input coupled to the output of the switchable impedance, a second input coupled to a reference, and an output coupled to the input of the charge pump. The capacitor has a first terminal coupled to the output of the charge pump and a second terminal coupled to the first input of the comparator. The switchable impedance causes a first impedance between the first and second terminals of the capacitor during a start-up operation of the charge pump system and a second impedance between the first and second terminals of the capacitor during a steady-state operation of the charge pump system, wherein the first impedance is lower than the second impedance.

20 Claims, 4 Drawing Sheets

US 8,917,136 B1

CHARGE PUMP SYSTEM AND METHOD OF OPERATION

BACKGROUND

1. Field

This disclosure relates generally to charge pump systems, and more specifically, to charge pump systems with a switchable impedance.

2. Related Art

Charge pumps are commonly used in integrated circuit applications to provide a regulated DC voltage source. FIG. 1 illustrates a charge pump system in accordance with the prior art which, when enabled, provides Vout at a desired target voltage. Vout is provided to a voltage divider formed by resistors 12 and 16, in which an output 14 of the voltage divider is provided to a negative input of a comparator 18. A reference voltage, Vref, is provided to the positive input of comparator 18. Vref is selected based on the desired target voltage for Vout. The output of comparator 18 is provided to clocks and charge pump unit 20 which provides Vout. Clocks and charge pump unit 20 uses switching devices and capacitive elements to adjust Vout based on the output of comparator 18. For example, when the voltage at node 14, which is a fraction of Vout, is below Vref, the output of comparator 18 is at a first logic state which enables clocks and charge pump unit 20. This results in unit 20 increasing Vout to the target voltage level. Upon the voltage at node 14 reaching Vref, the output of comparator 18 changes to a second logic state and disables clocks and charge pump unit 20. At this point, due to the load coupled to Vout, Vout decreases which causes the voltage at node 14 to decrease. However, once the voltage at node 14 again falls below Vref, comparator 18 toggles back to the first logic state, thus re-enabling clock and charge pump unit 20. Note that any known configuration may be used for clocks and charge pump unit 20. In system 10 of FIG. 1, large ripple results on Vout resulting from the delay through comparator 18 due to the attenuation of the differential input to the comparator by the resistor divider feedback formed by resistors 12 and 16. This creates undesirable noise in Vout.

FIG. 2 illustrates another prior art charge pump system configuration which attempts to address the ripple resulting from the voltage divider of FIG. 1. Charge pump system 21 of FIG. 2 includes a capacitor 25 coupled between Vout and node 24. Capacitor 25 provides an AC bypass of the voltage divider including resistors 22 and 23. Capacitor 25 decreases the steady state ripple on Vout by increasing the differential input (at node 24) to the negative input of comparator 26 during steady state operation of system 21. However, capacitor 25 creates an RC delay in reaching the desired DC operating point (the desired target voltage) during the startup transition of charge pump system 21. Therefore, ripple on Vout is reduced at the expense of increasing start up time.

Therefore, a need exists for an improved charge pump system which addresses the issues of ripple and start up time.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one embodiment of the present invention, a charge pump system, when enabled, provides Vout at a desired target voltage. The charge pump system includes a comparator, a charge pump having an input and an output, a switchable impedance coupled between the output of the charge pump and a first input of the comparator, and a capacitor having a first terminal coupled to the output of the charge pump and a second terminal coupled to the first input of the comparator. A second input of the comparator receives a reference voltage, Vref. The charge pump system, when enabled, enters a start-up operation in which Vout initially ramps up to the desired target voltage (also referred as the DC operating point). Upon reaching the desired target voltage, the charge pump system enters steady-state operation. During the start-up operation, the switchable impedance has a low impedance which allows for the capacitor to quickly charge in order to reach the steady-state operation in less time. During the steady-state operation, the switchable impedance is set to a high impedance which allows the capacitor to more directly couple the output of the charge pump to the first input of the comparator.

Figure 1:
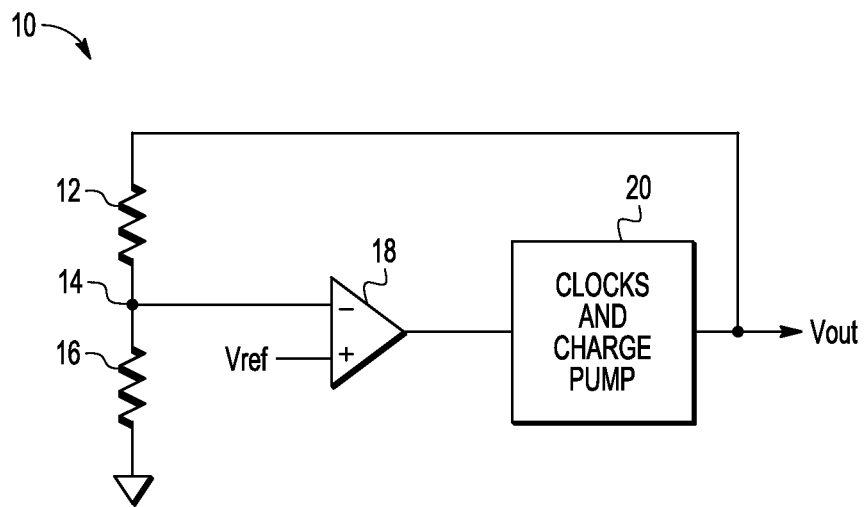
FIGS. 1 and 2 illustrate charge pump systems in accordance with the prior art.
Figure 2:
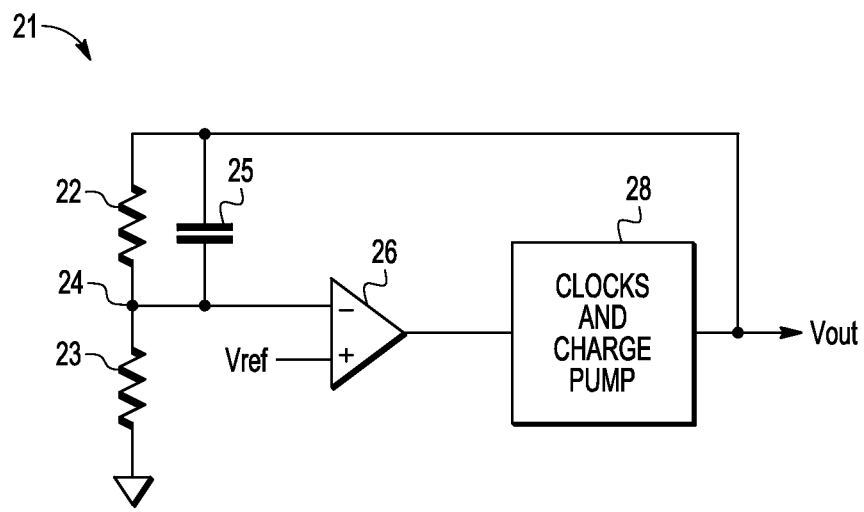
Figure 3:
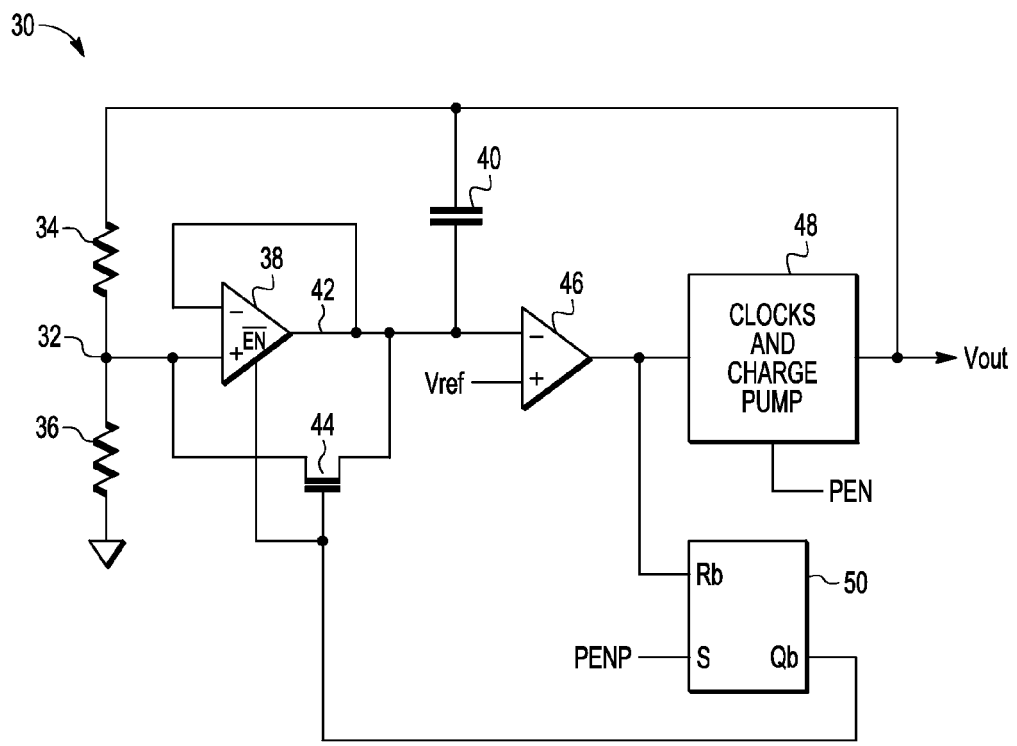
FIG. 3 illustrates, in partial schematic and partial block diagram form, a charge pump system in accordance with one embodiment of the present invention.

FIG. 3 illustrates, in partial block diagram and partial schematic form, a charge pump system 30 in accordance with one embodiment of the present invention. System 30 includes resistors 34 and 36, a buffer 38, a comparator 46, a capacitor 40, an N channel transistor 44, a clocks and charge pump unit 48, and a set-reset (SR) flip-flop 50. Clocks and charge pump unit 48 has an output which provides Vout and is coupled to a first terminal of capacitor 40 and a first terminal of resistor 34. A second terminal of resistor 34 is coupled to a circuit node 32, and a second terminal of capacitor 40 is coupled to a circuit node 42. A first terminal of resistor 36 is coupled to circuit node 32 and a second terminal of resistor 36 is coupled to a ground terminal. A negative input of buffer 38 is coupled to circuit node 42, an output of buffer 38 is coupled to circuit node 42, and a positive input of buffer 38 is coupled to circuit node 32. A negative input of comparator 46 is coupled to circuit node 42, a positive input of comparator 36 is coupled to receive a reference voltage, Vref, and an output of comparator 46 is coupled to an input of clocks and charge pump unit 48 and to an Rbar (Rb) input of SR flip-flop 50. A Qbar (Qb) output of SR flip-flop 50 is coupled to a control electrode of transistor 44 and to the inverse enable (ENb) of buffer 38. A first current electrode of transistor 44 is coupled to circuit node 32 and a second current electrode of transistor 44 is coupled to circuit node 42. Clocks and charge pump unit 48 also receives a pump enable signal, PEN, and the S input of SR flip-flop 50 is coupled to receive a pump enable pulse (PENP).

Clocks and charge pump unit 48 includes a charge pump coupled between the output of comparator 46 and provides Vout. Clocks and charge pump unit 48 also includes the clocks which are used to control the charge pump. Note that any known configuration may be used to implement clocks and charge pump unit 48. When Vout is below the desired target voltage, the clocks and charge pump of unit 48 are enabled to increase Vout. Upon reaching Vout, the clocks and charge pump of unit 48 are disabled, at which point, due to the load coupled to Vout, Vout decreases. However, once Vout falls below the desired target voltage, the clocks and charge pump of unit 48 are again enabled. In this manner, Vout provides a regulated DC voltage.

In operation, once charge pump system 30 is in steady-state operation, Qb is maintained a logic level one (as will be described below) which maintains transistor 44 on, thus coupling circuit node 32 to circuit node 42. Also, with Qb at a logic level one, and buffer 38 is disabled. Vout is provided to the first terminal of resistor 34, in which resistors 34 and 36 provide a voltage divider having an output at circuit node 32. The voltage at circuit node 32 is therefore a fraction of the voltage of Vout. The voltage at circuit node 32 is provided, by way of bypass transistor 44, to circuit node 42 at the negative input of comparator 46. If the voltage at circuit node 42 is less then Vref, then the output of comparator 46 is a logic level one and enables clocks and charge pump unit 48 to increase Vout toward a predetermined target voltage. This in turn results in an increase in the voltage at circuit node 42. Once the voltage at circuit node 42 reaches Vref, indicating that the target voltage for Vout has been achieved, the output of comparator 46 goes to a logic level zero, thus disabling clocks and charge pump unit 48. Due to delays in system 30, the voltage on Vout will overshoot the target voltage before the clocks and charge pump 48 can be shut off. At this point, due to the load coupled to Vout, Vout decreases. This results in a corresponding decrease in the voltage at circuit node 42. When this voltage reaches Vref, comparator 46 again outputs a logic level one and thus re-enables clocks and charge pump unit 48. Again, due to the delays in system 30, the voltage on Vout will undershoot the target voltage. In this manner, Vout is maintained at about the desired target level. The overshoots and undershoots correspond to the ripple on Vout which is to be reduced or minimized. Note that the value of Vref is therefore selected based on the desired target level of Vout.

Note that during steady-state operation, the impedance seen by capacitor 40 (at circuit node 42) is determined by the relatively high impedance of the voltage divider formed by resistors 34 and 36. That is, buffer 38 does not contribute to this impedance since it has been disabled and bypassed. In this manner, the impedance as seen by capacitor 40 is high such that Vout is directly coupled by capacitor 40 to the negative input of comparator 46 while the voltage divider formed by resistors 34 and 36 provide only direct current (DC) bias. Therefore, the ripple on Vout can be provided with lower attenuation to the negative input of comparator 46 which results in faster feedback to comparator 46 and consequently reduced overshoot and undershoot induced ripple on Vout. However, this high impedance at node 42 is undesirable during start-up because it delays the charging of capacitor 40 to achieve steady-state operation. Therefore, as will be described below, during start-up, buffer 38 is enabled and transistor 44 is off such that the impedance as seen by capacitor 40 at node 42 during start-up is much reduced as compared to the impedance seen during steady-state operation allowing capacitor 40 to be charged much more rapidly and Vout to ramp more quickly during start-up.

Once charge pump system is properly powered up, the pump enable signal, PEN, may be asserted in order to enable operation of system 30 to provide Vout at the desired target voltage. When PEN is asserted, the start-up operation of system 30 is initiated. When PEN is asserted, a pulse (PENP) is generated and provided to the S input of SR flip-flop 50. This results in Qb going to a logic level zero (since, in an SR flip-flop, when the S input is asserted to a logic level one, its output, Q, is a logic level one, and thus Qb to a logic level zero). Since Qb is a logic level zero, transistor 44 is turned off (i.e. placed in a non-conductive state) and buffer 38 is enabled. Buffer 38 provides low impedance buffering between circuit node 32 (between resistors 34 and 36) and circuit node 42 (which couples buffer 38 to capacitor 40 and to the negative input of comparator 46). In the illustrated embodiment, buffer 38 is a unity gain amplifier. Therefore, when enabled, buffer 38 provides current to capacitor 40 by way of circuit node 42. This allows capacitor 40 to quickly charge and achieve steady state. Initially, the voltage at circuit node 42 is zero and thus the output of comparator 46 is a logic level high which enables clocks and charge pump unit 48 to increase Vout. Once the voltage at circuit node 42 reaches Vref, the output of comparator 46 goes to a logic level zero which disables clocks and charge pump unit 48 and also causes Qb to go to a logic level one. At this point, the start-up operation ends at which point transistor 44 is turned on and buffer 38 is disabled. Charge pump system 30 continues to operate in steady-state operation as was described above. Also, since PENP is not again asserted until after charge pump system 30 has been disabled and again re-enabled to start up, Qb remains at a logic level one during steady-state operation.

Therefore, note that during start-up operation, the impedance seen by capacitor 40 is lower as compared to the impedance seen during steady-state operation due to the presence of buffer 38. In this manner, capacitor 40 can be more quickly charged as compared to buffer 38 not being present, allowing steady-state to be achieved more quickly.

Figure 4:
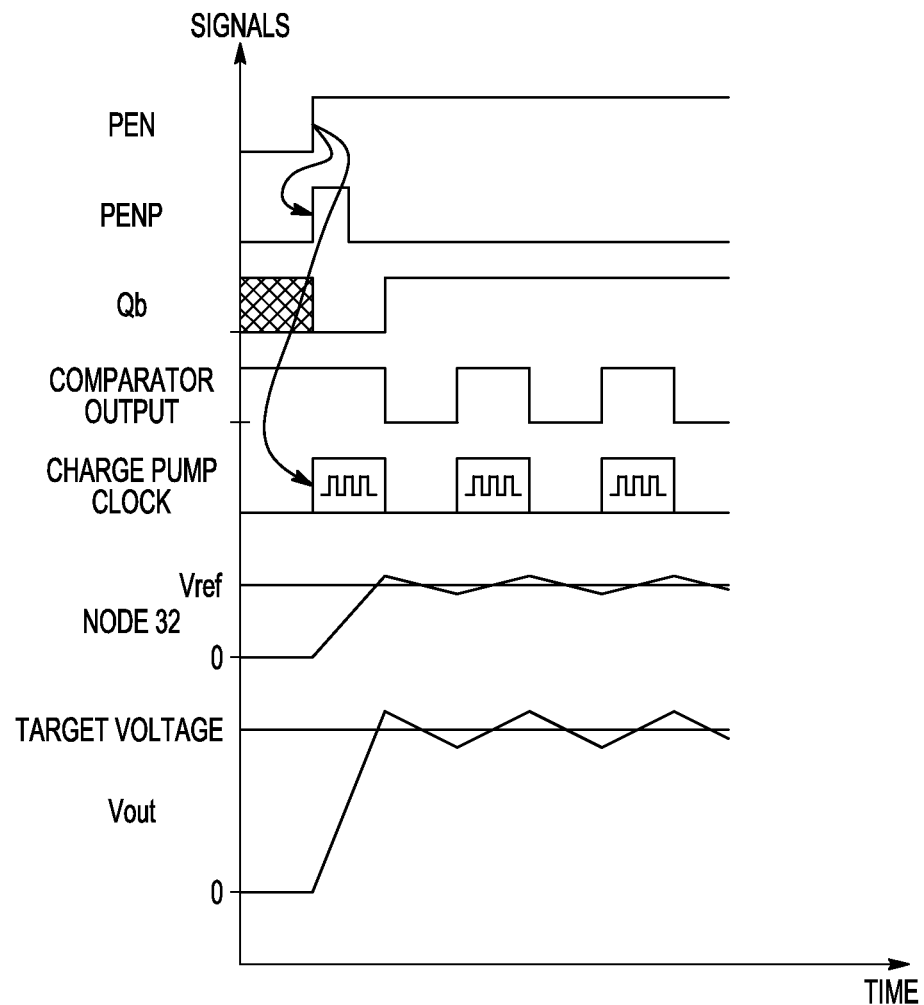
FIG. 4 illustrates, in timing diagram form, several signals during operation of the charge pump system of FIG. 3 in accordance with one embodiment of the present invention.

FIG. 4 illustrates, in timing diagram form, various signals from charge pump system 30 of FIG. 3 upon start-up of system 30. As seen in FIG. 4, upon wanting to start system 30, PEN is asserted. Assertion of PEN allows clocks and charge pump 48 to be responsive to the output of comparator 46. Also, assertion of PEN results in a pulse, PENP, being generated and provided to the S input of SR flip-flop 50. Therefore, Qb goes to a logic level zero which, as described above, turns off transistor 44 and enables buffer 38. Prior to the voltage at node 32 reaching Vref, the output of comparator 46 is a logic level one, thus enabling clocks and charge pump unit 48 to increase Vout. However, once the voltage at node 32 reaches Vref (which corresponds to Vout reaching the target desired voltage), the output of comparator 46 goes to a logic level zero which results in Qb going to a logic level one. At this point, the start-up operation has ended and system 30 is in steady-state operation. As can be seen in FIG. 4, during steady-state operation, Vout oscillates around the target voltage (corresponding to the ripple) resulting in node 32 oscillating about Vref. In this manner, during steady-state operation, system 30 provides Vout at about the desired target voltage.

Figure 5:
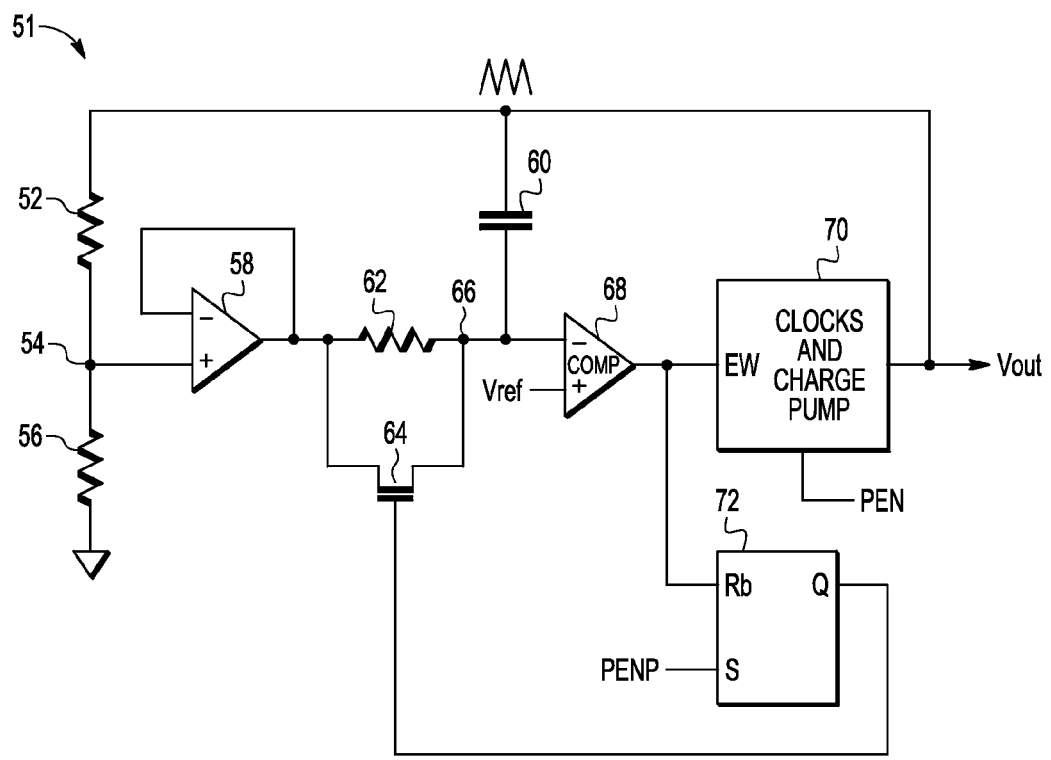
FIG. 5 illustrates, in partial schematic and partial block diagram form, a charge pump system in accordance with another embodiment of the present invention.

FIG. 5 illustrates, in partial block diagram and partial schematic form, a charge pump system 51 in accordance with another embodiment of the present invention. System 51 includes resistors 52, 56, and 62, a buffer 58, a comparator 68, a capacitor 60, an N channel transistor 64, a clocks and charge pump unit 70, and a set-reset (SR) flip-flop 72. Clocks and charge pump unit 70 has an output which provides Vout and is coupled to a first terminal of capacitor 60 and a first terminal of resistor 52. A second terminal of resistor 52 is coupled to a circuit node 54, and a second terminal of capacitor 60 is coupled to a circuit node 66. A first terminal of resistor 56 is coupled to circuit node 54 and a second terminal of resistor 56 is coupled to a ground terminal. A negative input of buffer 58 is coupled to an output of buffer 58 and a first terminal of resistor 62. A positive input of buffer 58 is coupled to circuit node 54. A second terminal of resistor 62 is coupled to circuit node 66. A negative input of comparator 68 is coupled to circuit node 66, a positive input of comparator 68 is coupled to receive a reference voltage, Vref, and an output of comparator 68 is coupled to an input of clocks and charge pump unit 70 and to an Rbar (Rb) input of SR flip-flop 72. A Q output of SR flip-flop 72 is coupled to a control electrode of transistor 64. A first current electrode of transistor 64 is coupled to the first terminal of resistor 62 and a second current electrode of transistor 64 is coupled to the second terminal of resistor 62. Clocks and charge pump unit 70 also receives a pump enable signal, PEN, and the S input of SR flip-flop 50 is coupled to receive a pump enable pulse (PENP).

Clocks and charge pump unit 70 includes a charge pump coupled between the output of comparator 68 and provides Vout. Clocks and charge pump unit 70 also includes the clocks which are used to control the charge pump. Note that any known configuration may be used to implement clocks and charge pump unit 70 and that the same descriptions provided above with respect to clocks and charge pump unit 48 apply to clocks and charge pump unit 70. Therefore, when Vout is below the desired target voltage, the clocks and charge pump of unit 70 are enabled to increase Vout. Upon reaching Vout, the clocks and charge pump of unit 70 are disabled, at which point, due to the load coupled to Vout, Vout decreases. However, once Vout falls below the desired target voltage, the clocks and charge pump of unit 70 are again enabled. In this manner, Vout provides a regulated DC voltage.

In operation, once charge pump system 51 is in steady-state operation, Q is maintained a logic level zero (as will be described below) which maintains transistor 64 off, thus coupling the output of buffer 58 to circuit node 66 and shorting resistor 62. Vout is provided to the first terminal of resistor 52, in which resistors 52 and 56 provide a voltage divider having an output at circuit node 54. The voltage at circuit node 54 is therefore a fraction of the voltage of Vout. Buffer 58 provides the voltage of node 54 to capacitor 60 at node 66 through transistor 64 and supplies sufficient current to charge capacitor 60. Buffer 58 also provides buffering between circuit node 54 and the negative input of comparator 68. In the illustrated embodiment, buffer 58 is implemented as a unity gain amplifier. If the voltage at circuit node 66 is less then Vref, then the output of comparator 68 is a logic level one and enables clocks and charge pump unit 70 to increase Vout. This in turn results in an increase in the voltage at circuit node 66. Once the voltage at circuit node 66 reaches Vref, the output of comparator 68 goes to a logic level zero, thus disabling clocks and charge pump unit 70. At this point, due to the load coupled to Vout, Vout decreases. This results in a decrease in the voltage at circuit node 66. When this voltage reaches Vref, comparator 68 again outputs a logic level one and thus re-enables clocks and charge pump unit 70. In this manner, Vout is maintained at about the desired target level. Note that the value of Vref is therefore selected based on the desired target voltage level of Vout.

Note that during steady-state operation, the impedance seen by capacitor 60 at circuit node 66 is determined by resistor 62, because resistor 62 is coupled between node 66 and the alternating current (AC) ground provided by the output of buffer 58. That is, resistor 62 is not shorted by transistor 64. In this manner, the impedance as seen by capacitor 60 is high such that Vout is directly coupled by capacitor 40 to the negative input of comparator 46 while resistor 62 provides only DC bias to the negative input of comparator 68. Therefore, the noise on Vout can be provided directly to the negative input of comparator 68 which results in reduced ripple on Vout. However, this high impedance at node 66 is undesirable during start-up because it delays the charging of capacitor 60 to achieve steady-state operation. Therefore, as will be described below, during start-up, transistor 64 is on which shorts resistor 62 such that the impedance as seen by capacitor 60 during start-up is much reduced as compared to the impedance seen during steady-state operation.

Once charge pump system is properly powered up, the pump enable signal, PEN, may be asserted in order to enable operation of system 51 to provide Vout at the desired target voltage. When PEN is asserted, the start-up operation of system 51 is initiated. When PEN is asserted, a pulse (PENP) is generated and provided to the S input of SR flip-flop 72. This results in Q going to a logic level one (since, in an SR flip-flop, when the S input is asserted to a logic level one, its output, Q, is a logic level one). Since Q is a logic level one, transistor 64 is turned on and resistor 62 is shorted. This results in a reduced impedance as seen by capacitor 60 and thus allows capacitor 60 to quickly charge and achieve steady state. Initially, the voltage at circuit node 66 is zero and thus the output of comparator 68 is a logic level high which enables clocks and charge pump unit 70 to increase Vout. Once the voltage at circuit node 66 reaches Vref, the output of comparator 68 goes to a logic level zero which disables clocks and charge pump unit 70 and also causes Q to go to a logic level zero. At this point, the start-up operation ends at which point transistor 64 is turned off (i.e. placed in a non-conductive state) and resistor 62 is no longer shorted. Charge pump system 51 continues to operate in steady-state operation as was described above. Also, since PENP is not again asserted until after charge pump system 51 has been disabled and again re-enabled to start up, Q remains at a logic level zero during steady-state operation. Note that resistors 62 and transistor 64 may be referred to, collectively, as a switchable resistance and is coupled between an output of buffer 58 and circuit node 66. The switchable resistance may therefore be used to add resistance in series between the output of buffer 58 and the negative input of comparator 68.

Therefore, note that during start-up operation, the impedance seen by capacitor 60 is lower as compared to the impedance seen during steady-state operation due to the shorting of resistor 62. In this manner, capacitor 60 can be more quickly charged as compared to resistor 62 being present, allowing steady-state to be achieved more quickly.

Therefore, by now it has been appreciated how there has been provided a charge pump system which includes a switchable impedance that allows for reduced start-up delay and reduced ripple. In the above examples, a switchable impedance is coupled between Vout and a second terminal of the capacitor (either capacitor 40 or 60). In the example of FIG. 3, buffer 38 and transistor 44 (in which transistor 44 can selectively bypass buffer 38) offers a switchable impedance that has a first impedance during start-up and a second impedance during steady-state operation. In the example of FIG. 5, resistor 62 and transistor 64 (in which transistor 64 can selectively short resistor 62) offers a switchable impedance that has a first impedance during start-up and a second impedance during steady-state operation. In the examples of FIGS. 3 and 5, the first impedance during start-up is lower than the second impedance during steady-state. This allows for the charge pump system to more quickly reach steady-state operation upon start-up while still allowing for reduced ripple on Vout during steady-state operation.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a "b" following the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Although the invention is described herein with reference to specific embodiments, various modifications and changes can be made without departing from the scope of the present invention as set forth in the claims below. For example, transistors 44 and 64 may be implemented by transistors of different conductivity types, such as P channel transistors rather than N channel transistors. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a charge pump system which includes a charge pump having an input and an output; a switchable impedance having an input coupled to the output of the charge pump and an output; a comparator having a first input coupled to the output of the switchable impedance, a second input coupled to a reference, and an output coupled to the input of the charge pump; and a capacitor having a first terminal coupled to the output of the charge pump and a second terminal coupled to the first input of the comparator; wherein the switchable impedance causes a first impedance between the first and second terminals of the capacitor during a start-up operation of the charge pump system and a second impedance between the first and second terminals of the capacitor during a steady-state operation of the charge pump system, wherein the first impedance is lower than the second impedance. Item 2 includes the charge pump system of item 1, and further includes a voltage divider having an input node coupled to the output of the charge pump system and an output node coupled to the input of the switchable impedance. Item 13 includes the charge pump system of item 2, wherein the voltage divider includes a first resistor having a first terminal coupled to the output of the charge pump system and a second terminal; and a second resistor having a first terminal coupled to the second terminal of the first resistor and a second terminal coupled to a power supply terminal. Item 4 includes the charge pump system of item 3, wherein the power supply terminal is ground, the first input of the comparator is an inverting input and the second input is a non-inverting input. Item 5 includes the charge pump system of item 2, wherein the switchable impedance includes a buffer having an input coupled to the output node of the voltage divider and an output coupled to the first input of the comparator, wherein the buffer is enabled during the start-up operation and disabled during the steady-state operation; and a transistor having a first current electrode coupled to the input of the buffer and a second current electrode coupled to the output of the buffer, wherein the transistor is conductive during the steady-state operation and non-conductive during the start-up operation. Item 6 includes the charge pump system of item 5, and further includes a flip-flop coupled to the output of the comparator and responsive to a pulse enable signal, wherein the flip-flop enables the buffer and disables the transistor during the start-up operation and enables the transistor and disables the buffer during the steady-state operation. Item 7 includes the charge pump system of item 6, wherein the buffer is a unity gain amplifier and the transistor is an N channel transistor. Item 8 includes the charge pump system of item 2, wherein the switchable impedance includes a buffer having an input coupled to the output of the voltage divider and an output; and a switchable resistance having a first terminal coupled to the output of the buffer and a second terminal coupled to the first input of the comparator, wherein the switchable resistance provides a first impedance during the steady-state operation and a second impedance during the start-up operation, wherein the first impedance is higher than the second impedance. Item 9 includes the charge pump system of item 8, wherein the switchable resistance includes a resistor having a first terminal coupled to the output of the buffer and a second terminal coupled to the first input of the comparator; and a transistor having a first current electrode coupled to the output of the buffer and a second electrode coupled to the input of the comparator, wherein the transistor is non-conductive during the steady-state operation and conductive during the start-up operation. Item 10 includes the charge pump system of item 5, and further includes a flip-flop coupled to the output of the comparator and responsive to a pulse enable signal, wherein the flip-flop enables the transistor during the start-up operation and disables the transistor during the steady-state operation.

Item 11 includes a method of operating a charge pump system having a voltage divider, a comparator, a capacitor, and a charge pump, wherein the capacitor is coupled between a first input of the comparator and an output of the charge pump and wherein a second input of the comparator is coupled to a reference. The method includes coupling a first impedance to a first terminal of the capacitor during a start-up operation of the charge pump system; and coupling a second impedance to the first terminal of the capacitor during a steady-state operation of the charge pump system, wherein the second impedance is greater than the first impedance. Item 12 includes the method of item 11, wherein the coupling the first impedance comprises providing buffering between the output node of the voltage divider and the first input of the comparator. Item 13 includes the method of item 12, wherein the coupling the second impedance comprises shorting the output node of the voltage divider to the first input of the comparator whereby the voltage divider comprises the second impedance. Item 14 includes the method of item 13, wherein the coupling the first impedance is initiated in response to an output of a flip-flop responsive to a pump enable pulse. Item 15 includes the method of item 14, wherein the coupling the second impedance is initiated in response to the output of the flip-flop responding to a change in a state of the output of the comparator. Item 16 includes the method of item 11, wherein the coupling the first impedance comprises providing buffering from the output node of the voltage divider to the first input of the comparator. Item 17 includes the method of item 16, wherein the coupling the second impedance comprises adding resistance in series between the buffering and the first input of the comparator. Item 18 includes the method of item 17, wherein the coupling the second impedance is initiated in response to a first change in state of the output of the comparator after the start-up operation was initiated.

Item 19 includes a charge pump system which includes a charge pump having an input and an output; a voltage divider having an input coupled to the output of the charge pump and an output; a switchable impedance having an input coupled to the output of the charge pump and an output; a comparator having a first input coupled to the output of the switchable impedance, a second input coupled to a reference, and an output coupled to the input of the charge pump; and a capacitor having a first terminal coupled to the output of the charge pump and a second terminal coupled to the first input of the comparator; wherein the switchable impedance causes a first impedance between the first and second terminals of the capacitor during a start-up operation of the charge pump system in response to a pump enable pulse and a second impedance between the first and second terminals of the capacitor during a steady-state operation of the charge pump system initiated by a first change in state of the output of the comparator after the pump enable pulse, wherein the first impedance is lower than the second impedance. Item 20 includes the charge pump system of item 19, wherein the switchable impedance comprises a unity gain amplifier.

What is claimed is:

1. A charge pump system, comprising:
   a charge pump having an input and an output;
   a switchable impedance having an input coupled to the output of the charge pump and an output;
   a comparator having a first input coupled to the output of the switchable impedance, a second input coupled to a reference, and an output coupled to the input of the charge pump; and
   a capacitor having a first terminal coupled to the output of the charge pump and a second terminal coupled to the first input of the comparator;
   wherein the switchable impedance causes a first impedance between the first and second terminals of the capacitor during a start-up operation of the charge pump system and a second impedance between the first and second terminals of the capacitor during a steady-state operation of the charge pump system, wherein the first impedance is lower than the second impedance.

2. The charge pump system of claim 1, further comprising a voltage divider having an input node coupled to the output of the charge pump system and an output node coupled to the input of the switchable impedance.

3. The charge pump system of claim 2, wherein the voltage divider comprises:
   a first resistor having a first terminal coupled to the output of the charge pump system and a second terminal; and
   a second resistor having a first terminal coupled to the second terminal of the first resistor and a second terminal coupled to a power supply terminal.

4. The charge pump system of claim 3, wherein the power supply terminal is ground, the first input of the comparator is an inverting input and the second input is a non-inverting input.

5. The charge pump system of claim 2 wherein the switchable impedance comprises:
   a buffer having an input coupled to the output node of the voltage divider and an output coupled to the first input of the comparator, wherein the buffer is enabled during the start-up operation and disabled during the steady-state operation; and
   a transistor having a first current electrode coupled to the input of the buffer and a second current electrode coupled to the output of the buffer, wherein the transistor is conductive during the steady-state operation and non-conductive during the start-up operation.

6. The charge pump system of claim 5, further comprising a flip-flop coupled to the output of the comparator and responsive to a pulse enable signal, wherein the flip-flop enables the buffer and disables the transistor during the start-up operation and enables the transistor and disables the buffer during the steady-state operation.

7. The charge pump system of claim 6, wherein the buffer is a unity gain amplifier and the transistor is an N channel transistor.

8. The charge pump system of claim 2, wherein the switchable impedance comprises:
   a buffer having an input coupled to the output of the voltage divider and an output; and
   a switchable resistance having a first terminal coupled to the output of the buffer and a second terminal coupled to the first input of the comparator, wherein the switchable resistance provides a first impedance during the steady-state operation and a second impedance during the start-up operation, wherein the first impedance is higher than the second impedance.

9. The charge pump system of claim 8, wherein the switchable resistance comprises:
   a resistor having a first terminal coupled to the output of the buffer and a second terminal coupled to the first input of the comparator; and
   a transistor having a first current electrode coupled to the output of the buffer and a second electrode coupled to the input of the comparator, wherein the transistor is non-conductive during the steady-state operation and conductive during the start-up operation.

10. The charge pump system of claim 8, further comprising a flip-flop coupled to the output of the comparator and responsive to a pulse enable signal, wherein the flip-flop enables the transistor during the start-up operation and disables the transistor during the steady-state operation.

11. A method of operating a charge pump system having a voltage divider, a comparator, a capacitor, and a charge pump, wherein the capacitor is coupled between a first input of the comparator and an output of the charge pump and wherein a second input of the comparator is coupled to a reference, comprising:

coupling a first impedance to a first terminal of the capacitor during a start-up operation of the charge pump system; and coupling a second impedance to the first terminal of the capacitor during a steady-state operation of the charge pump system, wherein the second impedance is greater than the first impedance.

12. The method of claim 11 wherein the coupling the first impedance comprises providing buffering between the output node of the voltage divider and the first input of the comparator.

13. The method of claim 12, wherein the coupling the second impedance comprises shorting the output node of the voltage divider to the first input of the comparator whereby the voltage divider comprises the second impedance.

14. The method of claim 13, wherein the coupling the first impedance is initiated in response to an output of a flip-flop responsive to a pump enable pulse.

15. The method of claim 14, wherein the coupling the second impedance is initiated in response to the output of the flip-flop responding to a change in a state of the output of the comparator.

16. The method of claim 11, wherein the coupling the first impedance comprises providing buffering from an output node of the voltage divider to the first input of the comparator.

17. The method of claim 16, wherein the coupling the second impedance comprises adding resistance in series between the buffering and the first input of the comparator.

18. The method of claim 17 wherein the coupling the second impedance is initiated in response to a first change in state of the output of the comparator after the start-up operation was initiated.

19. A charge pump system, comprising:

a charge pump having an input and an output;

a voltage divider having an input coupled to the output of the charge pump and an output;

a switchable impedance having an input coupled to the output of the voltage divider and an output;

a comparator having a first input coupled to the output of the switchable impedance, a second input coupled to a reference, and an output coupled to the input of the charge pump; and a capacitor having a first terminal coupled to the output of the charge pump and a second terminal coupled to the first input of the comparator;

wherein the switchable impedance causes a first impedance between the first and second terminals of the capacitor during a start-up operation of the charge pump system in response to a pump enable pulse and a second impedance between the first and second terminals of the capacitor during a steady-state operation of the charge pump system initiated by a first change in state of the output of the comparator after the pump enable pulse, wherein the first impedance is lower than the second impedance.

20. The charge pump system of claim 19, wherein the switchable impedance comprises a unity gain amplifier.

* * * * *